United States Patent [19]
Chaney

[11] Patent Number: 6,035,037
[45] Date of Patent: Mar. 7, 2000

[54] SYSTEM FOR PROCESSING A VIDEO SIGNAL VIA SERIES-CONNECTED HIGH SPEED SIGNAL PROCESSING SMART CARDS

[75] Inventor: John William Chaney, Gilroy, Calif.

[73] Assignee: Thomson Electronic Consumers, Inc., Indianapolis, Ind.

[21] Appl. No.: 08/776,556

[22] PCT Filed: Aug. 4, 1995

[86] PCT No.: PCT/US95/09891

§ 371 Date: Jan. 30, 1997

§ 102(e) Date: Jan. 30, 1997

[87] PCT Pub. No.: WO96/07267

PCT Pub. Date: Mar. 7, 1996

[51] Int. Cl.[7] .................................................. H04N 7/167
[52] U.S. Cl. ............................. 380/10; 348/5.5; 348/565; 380/5
[58] Field of Search .................... 380/20, 10, 3, 380/4, 5; 348/5.5, 7, 6, 553, 565, 566; 455/3, 2, 6.1, 6.2

[56] References Cited

U.S. PATENT DOCUMENTS

| | | | |
|---|---|---|---|
| 4,509,210 | 4/1985 | Kohn | 455/349 |
| 4,599,647 | 7/1986 | George et al. | 358/122 |
| 4,685,131 | 8/1987 | Horne | 380/20 |
| 4,694,491 | 9/1987 | Horne et al. | 380/20 |
| 4,739,510 | 4/1988 | Jeffers et al. | 380/15 |
| 4,803,725 | 2/1989 | Horne et al. | 380/44 |
| 4,816,653 | 3/1989 | Anderl et al. | 235/380 |
| 4,816,654 | 3/1989 | Anderl et al. | 238/380 |
| 4,829,569 | 5/1989 | Seth-Smith et al. | 380/10 |
| 4,841,133 | 6/1989 | Gercekci et al. | 235/492 |
| 4,864,614 | 9/1989 | Crowther | 380/10 |
| 4,866,770 | 9/1989 | Seth-Smith | 380/20 |
| 4,882,474 | 11/1989 | Anderl et al. | 235/380 |
| 4,887,296 | 12/1989 | Horne | 380/21 |
| 4,890,319 | 12/1989 | Seth-Smith et al. | 380/5 |
| 4,890,321 | 12/1989 | Seth-Smith | 380/20 |

(List continued on next page.)

FOREIGN PATENT DOCUMENTS

| | | |
|---|---|---|
| 562295 | 9/1993 | European Pat. Off. . |
| 2261580 | of 0000 | United Kingdom . |

OTHER PUBLICATIONS

International Standard, ISO 7816-1 "Identification Cards–Integrated Circuit (S) Cards With Contacts" Part 1: Physical characteristics.

International Standard, ISO 7816-2 "Identification Cards–Integrated Circuit (S) Cards With Contacts" Part 2: Dimensions and location of the contacts.

International Standard, ISO 7816-3 "Identification Cards–Integrated Circuit (S) Cards With Contacts" Part 3: Electronic signals and transmission protocols.

Article: National Plays Encryption Card Jan. 17, 1994, Elec. Eng. Times.

Article: Mercury One–1–One Creates Credit–card tie–in, Fletcher, Jun. 13, 1994, Electronics.

(List continued on next page.)

*Primary Examiner*—Gail O. Hayes
*Assistant Examiner*—Christopher M. Tucker
*Attorney, Agent, or Firm*—Joseph S. Tripoli; Peter M. Emanuel; David T. Shoneman

[57] ABSTRACT

A system processes a video signal that includes a plurality of signal components representing respective ones of a plurality of video programs such as various pay-TV programs. Each of the signal components is processed, e.g., descrambling a pay-TV program, by one of a plurality of series connected high speed signal processing integrated circuit (IC) cards, or "smart" cards. An output signal from the last smart card in the series connection includes a plurality of processed signal components. The plurality of processed signal components are processed further to produce a signal suitable for producing a displayed image that includes multiple image portions, such as a picture-in-picture (PIP) or picture-outside-picture (POP) image in a television system. Each portion of the image is produced in response to one of the processed signal components.

16 Claims, 11 Drawing Sheets

U.S. PATENT DOCUMENTS

| | | | |
|---|---|---|---|
| 4,905,280 | 2/1990 | Wiedener | 380/16 |
| 4,908,834 | 3/1990 | Wiedemer | 380/5 |
| 4,937,866 | 6/1990 | Crowther et al. | 380/20 |
| 4,993,066 | 2/1991 | Jenkins | 380/16 |
| 5,029,207 | 7/1991 | Gammie | 380/10 |
| 5,034,597 | 7/1991 | Atsumi et al. | 235/380 |
| 5,036,537 | 7/1991 | Jeffers et al. | 380/20 |
| 5,060,079 | 10/1991 | Rufus-Isaacs | 358/349 |
| 5,111,504 | 5/1992 | Esserman et al. | 380/21 |
| 5,113,441 | 5/1992 | Harada | 380/15 |
| 5,120,939 | 6/1992 | Claus et al. | 235/382 |
| 5,144,664 | 9/1992 | Esserman et al. | 380/20 |
| 5,149,945 | 9/1992 | Johnson et al. | 235/380 |
| 5,161,187 | 11/1992 | Kaita et al. | 380/15 |
| 5,204,512 | 4/1993 | Leki et al. | 235/382 |
| 5,224,161 | 6/1993 | Daniel et al. | 380/14 |
| 5,237,610 | 8/1993 | Gammie et al. | 380/10 |
| 5,267,312 | 11/1993 | Thompson et al. | 380/29 |
| 5,272,751 | 12/1993 | Kajita et al. | 380/17 |
| 5,282,249 | 1/1994 | Cohen et al. | 380/23 |
| 5,339,402 | 8/1994 | Ueda | 395/425 |
| 5,389,738 | 2/1995 | Poisenka et al. | 174/52.4 |
| 5,410,599 | 4/1995 | Crowley et al. | 380/9 |
| 5,426,701 | 6/1995 | Herrmann | 380/52 |
| 5,461,675 | 10/1995 | Diehl et al. | 380/23 |
| 5,698,837 | 12/1997 | Furuta | 235/492 |
| 5,736,728 | 4/1998 | Matsubara | 235/492 |
| 5,742,680 | 4/1998 | Wilson | 380/16 |
| 5,753,902 | 5/1998 | Fujioka | 235/492 |

OTHER PUBLICATIONS

EIA Standard for Contional Access, Ver. 2.0 Draft Apr. 7, 1994, National Renewable Security Standards Committee.

European Scrambling Systems, Waterford Un. Press, '93, pp. 7–1/7–15.

Satellite Book/ The VideoCrypt Encryption System, R. Crossley, '94.

| CONTACT NO. | ASSIGNMENT | CONTACT NO. | ASSIGNMENT |
|---|---|---|---|
| C1 | VCC (SUPPLY VOLTAGE) | C5 | GND (GROUND) |
| C2 | RST (RESET SIGNAL) | C6 | VPP (PROGRAMMING VOLTAGE) |
| C3 | CLK (CLOCK SIGNAL) | C7 | I/O (DATA INPUT/OUTPUT) |
| C4 | RESERVED TO ISO/IEC JTC 1/SC 17 FOR FUTURE USE | C8 | RESERVED TO ISO/IEC JTC 1/SC 17 FOR FUTURE USE |

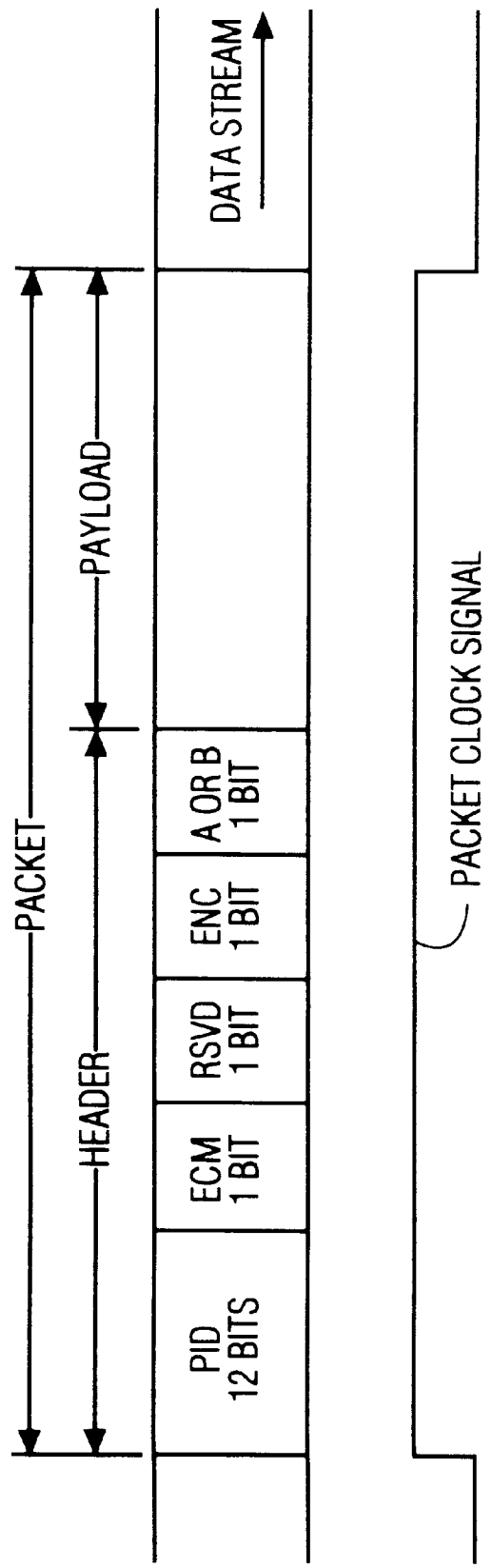

SYSTEM FOR PROCESSING A VIDEO SIGNAL VIA SERIES-CONNECTED HIGH SPEED SIGNAL PROCESSING SMART CARDS

The present invention involves access control systems including an integrated circuit (IC) card, or "smart" card, for limiting access to information in signal processing applications. Systems such as pay-TV systems include access control sub-systems that limit access to certain programs or channels. Only users who are entitled (e.g., paid a fee) are permitted to view the programs. One approach to limiting access is to modify the signal by, for example, scrambling or encrypting the signal. Scrambling typically involves modifying the form of the signal using methods such as removing synchronization pulses. Encryption involves modifying a data component included in the signal according to a particular cryptographic algorithm. Only individuals who are entitled to access are given the "key" needed to descramble or decrypt the signal. The terms scrambling and descrambling as used below are intended to encompass access control techniques in general, including cryptography and scrambling.

Access control systems may include an integrated circuit (IC) card, or "smart" card, feature. A smart card is a plastic card the size of a credit card that has a signal processing IC embedded in the plastic. A smart card is inserted into a card reader that couples signals to and from the IC in the card. International Standards Organization (ISO) standard 7816 establishes specifications for an IC card interface. In particular, ISO standard 7816-2 specifies that the electrical interface to the card will be via eight contacts positioned on the card surface as shown in FIG. 2A. Six of the eight signals at the contact points are defined as VCC (supply voltage), RST (reset signal), CLK (clock signal), GND (ground), VPP (programming voltage for programming memory in the card IC), and I/O (serial data input/output). Two contacts are reserved for future use. The assignment of the signals to the smart card contacts is shown in FIG. 2B.

The IC in a smart card processes data such as security control information as part of an access control protocol. The IC includes a control microcomputer, such as the 6805 processor from Motorola Semiconductor, Austin, Tex., which includes ROM, EEPROM, and RAM memory. The processor performs various security control functions including entitlement management and generating the key for descrambling the scrambled data component of the signal.

Entitlement management involves modifying information stored in the card that specifies the card owner's entitlements (i.e. programs and services that a user is entitled to access). The processor adds and deletes entitlements in response to entitlement information in entitlement management messages (EMM) that are included in the input signal. EMM data typically indicates entitlement to a particular service, e.g. all programming on a particular channel, or to a particular program offered by a service, e.g., one movie on a particular channel. Because EMM relates to relatively long term entitlement, EMM typically occurs infrequently in a signal.

Once entitled to a service or program, descrambling of the service or program can occur only after generating a descrambling key. Key generation occurs in response to entitlement control messages (ECM) that are also included in the input signal. ECM provides initialization data for key generation routines that are executed by the processor. Each time a service provider changes the scrambling key, ECM data is included in the signal so that a system entitled to access can generate the corresponding new descrambling key. To aid in preventing unauthorized access to scrambled signals, the key is changed frequently, e.g., every two seconds. Thus, ECM data occurs frequently in the signal.

EMM and ECM data is transferred to the smart card for processing via the serial I/O terminal of the ISO standard 7816 interface. The serial I/O terminal is also used to transfer the generated key from the card to a descrambler unit in the video signal processing channel. The descrambler descrambles the data component of the input signal, e.g. video and audio data, using the key to produce a descrambled, or "plaintext", output signal. Descrambling involves reversing the effects of the scrambling process, e.g., re-inserting sync pulses or decrypting data using the inverse of the encryption algorithm. The descrambled signal is processed further by the signal processing channel to produce video and audio signals suitable for coupling to output devices such as a kinescope and a loudspeaker, respectively.

Including a descrambling function in the video signal processing channel involves adding descrambling hardware to the system. The hardware may be included in a consumer electronics (CE) device, such as a television receiver, or may be in a stand-alone decoder unit, such as a cable box. Including descrambling hardware in a CE device or separate decoder unit dedicates the device to a particular access control system. For example, the hardware may be appropriate for descrambling only a particular type of scrambling algorithm. If the service provider decides to change to a different access control system, e.g. due to security problems, replacing the descrambling hardware involves the expensive and difficult task of modifying CE devices and/or replacing decoder units.

In addition, transferring a descrambling key generated by a smart card to a descrambler external to the smart card provides an opportunity for a "hacker" to attack the security system. Because the security control IC is embedded in the smart card, a hacker cannot access the IC directly as part of an attempt to "hack", i.e. defeat, the security algorithm. Attempting to delaminate the smart card to access the IC will destroy the IC. However, transferring the key to a descrambler via the card interface increases the likelihood that a hacker may monitor the key transfer protocol, intercept the key and compromise the access control system. Also, an existing smart card provides access control in regard to a particular signal source, but implementing certain features in television systems may require access control for multiple signal sources simultaneously. For example, picture-in-picture (pix-in-pix or PIP) displays and picture-outside-picture (POP) may require incorporating signals from two or more different sources into an image signal that is supplied to a display device. To provide features such as PIP or POP using signals from multiple pay TV sources requires providing access control processing simultaneously for each of the pay TV sources.

An example of a pay-TV decoder using smart cards is described by Diehl et al in European Patent Application 0 562 295 A1 entitled METHOD AND APPARATUS FOR CONTROLLING SEVERAL SMART CARDS which was published Sep. 29, 1993 in Bulletin 93/39. It is recognized therein that if a user owns several smart cards with each one dedicated to a specific broadcaster, then each time the user switches from one channel to another the user has to exchange the smart cards in order to be able to descramble the new channel. To enhance the ease of use of such conditional access systems, several card readers are connected and controlled by a single processor. To facilitate this, a special power supply unit controlled by the processor supplies the card readers with appropriate voltages.

The present invention is directed to providing a solution to the problem of signal access control (e.g., signal decryptation) when information from more than one video signal is to be received and simultaneously displayed (e.g., PIP, POP, etc.) on a display screen.

In accordance with an aspect of the invention, a video signal including first and second signal components representative of respective first and second video programs is processed via a data path including first and second smart cards. The signal that results from processing by the smart cards is processed further to provide a signal suitable for producing a displayed image that includes first and second portions corresponding to the first and second video programs, respectively.

In accordance with another aspect of the invention, the first and second signal components of the video signal include respective first and second scrambled signal components that are descrambled by the first and second smart cards, respectively.

In accordance with another aspect of the invention, the video signal including first and second signal components representing first and second video programs is produced by combining a first signal including the first signal component and a second signal including the second signal component.

The invention may be better understood by referring to the accompanying drawing in which:

FIG. 3 shows a format that data included in a signal processed by the system shown in FIG. 1 may exhibit;

An embodiment of a smart card access control system including the invention will be described in reference to an exemplary video signal processing system that is shown in block diagram form in FIG. 1. The system shown in FIG. 1 includes signal processing functions that may be found in various signal processing systems. A specific example is the DSS® direct-broadcast satellite television system developed by Thomson Consumer Electronics, Inc.

For a pay-TV service that involves a smart card based access control system, a user wishing to purchase the service contacts the service provider, pays a service-access fee and receives a smart card. A card is issued to a user with initial entitlement information stored in the card's EEPROM. Entitlement information may include data identifying the user and data specifying the scope of initial access entitlement (e.g., duration and/or specific programs the user has paid for). In addition, application-specific key generation software is stored in the card memory.

Entitlement information stored in the card can be modified by the service provider from a remote location using entitlement management messages (EMM) and entitlement control messages (ECM) that are inserted into portions of the signal. EMM includes information indicating subscription (long term access) and pay-per-view (single program access) services that the user has paid for. EMM may be directed to a particular smart card by including identification information in EMM data that corresponds to the identification information stored in the particular smart card. ECM includes data such as initialization data needed to generate descrambling keys. Thus, a signal for a particular program includes both a scrambled data component comprising video and audio data, and a control information component comprising EMM and ECM.

Figure 1:
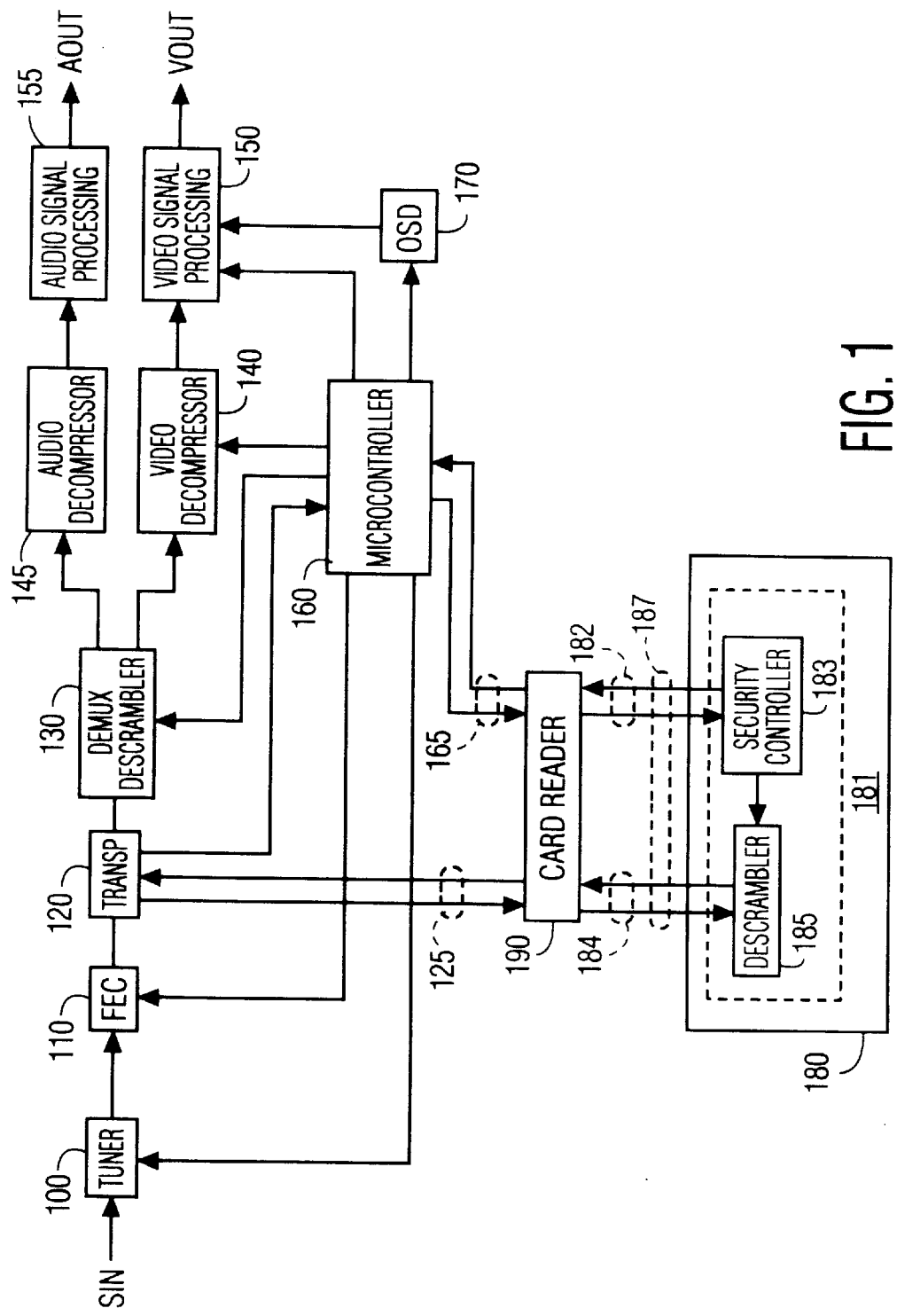
FIG. 1 shows, in block diagram form, a signal processing system including a smart card that provides both entitlement processing and descrambling.

When the user wishes to access a pay-TV service, smart card 180 in FIG. 1 is inserted into card reader 190. Card reader 190 couples signals between smart card 180 and a signal processing channel comprising units 100 through 170 in FIG. 1. More specifically, card reader 190 connects to eight terminals that are located on the surface of smart card 180 as specified in ISO standard 7816-2 (see FIG. 2). The connection established by card reader 190 creates interface 187 between smart card 180 and the signal processing channel. In accordance with an aspect of the invention described further below, the eight signals in interface 187 include signals 184 appearing on a high speed data input/output (I/O) port for smart card 180, and signals 182 representing a subset of the ISO standard IC card interface signals.

The desired program or service is selected by tuning the receiver to the appropriate channel using tuner 100. Tuner 100 is controlled by microcontroller 160 in response to user inputs. For example, microcontroller 160 may receive channel selection signals from a remote control (not shown in FIG. 1) activated by a user. In response to the channel selection signals, microcontroller 160 generates control signals causing tuner 100 to tune the selected channel.

The output of tuner 100 is coupled to forward error corrector (FEC) 110. FEC 110 monitors error control information, such as parity bits in the tuned signal, to detect errors and, depending on the error control protocol, to correct errors. Microcontroller 160 is coupled to FEC 110 to monitor the occurrence of errors in the signal and control the processing of errors. FEC 110 also performs an analog-to-digital conversion (ADC) function to convert the analog output of tuner 100 to a digital signal at the output of FEC 110.

Transport unit 120 processes the signal from FEC 110 to detect and separate various types of data in the tuned signal. The data in the signal may be arranged in various formats. FIG. 3 shows an exemplary data format that serves as the basis for the following description. The signal depicted in FIG. 3 comprises a stream of data organized in packets of data bytes, i.e. "packetized" data. Each packet is associated with a particular type, or sub-stream, of information in the tuned channel's data stream. For example, the signal includes packets of program-guide information, control information (e.g., ECM or EMM), video information, and audio information. The sub-stream that a particular packet is associated with is defined by data included in a header portion of each packet. A payload portion of each packet includes the packet data. The exemplary data format shown in FIG. 3 includes two bytes (16 bits) of data in the header and 186 bytes of data in the payload.

The first twelve bits of the header in each packet are program identification (PID) data bits. PID data identifies the data substream that the payload data is associated with. An example of the information provided by PID data follows:

TABLE 1

| PID Value | Payload contents |
| --- | --- |
| 1 | program-guide information |
| 4 | EMM |
| 10 | video data for channel 101 |
| 11 | audio data for channel 101. |

Other PID values identify video and audio data for other channels.

As part of the tuning process, microcontroller 160 refers to a PID "map" stored in the microcontroller's memory to determine the PID values associated with the tuned channel. The appropriate PID values are loaded into PID registers in transport unit 120. For example, when channel 101 is selected, microcontroller 160 accesses the stored PID map, determines that video data and audio data for channel 101 are associated with PID values of 10 and 11, respectively, and loads the values 10 and 11 into respective video and audio PID registers in transport unit 120. The PID data in incoming packets is compared to the PID values stored in the PID registers to determine the content of the payload of each packet. Microcontroller 160 can update the PID map data in response to PID-to-charnel correspondence information in "program guide" packets (PID value of 1).

The last four bits of the header portion of each packet further define the payload contents as follows:

TABLE 2

| Header bit | Designation | Function |
| --- | --- | --- |
| 13 | ECM flag | indicates if payload is ECM |
| 14 |  | reserved |
| 15 | ENC flag | indicates if payload is encrypted |
| 16 | Key flag | indicates whether payload key is key A or key B. |

The ECM flag being active, e.g., at logic 1, indicates that the payload includes ECM data such as initialization data for key generation. The ENC flag being active indicates that the payload is encrypted and, therefore, must be descrambled. The key flag determines which one of two keys, key A and key B, should be used for descrambling the payload (e.g., logic 0 indicates key A, logic 1 indicates key B). Use of the key flag is described below in regard to FIG. 7.

Transport unit 120 in FIG. 1 extracts and processes the header data in response to a packet clock signal shown in FIG. 3. The packet clock signal is generate and synchronized to the data stream by FEC 110. Each transition of the packet clock signal indicates the beginning of a packet. Transport unit 120 processes the 16 bits of header data following each packet clock signal transition to determine the destination for the packet payload. For example, transport unit 120 transfers payloads containing EMM (PID value of 4) and ECM to security controller 183 in smart card 180 via microcontroller 160. Video and audio data are directed to demux/descrambler 130 for descrambling and demultiplexing into video and audio signals. Program guide data (PID value of 1) is directed to microcontroller 160 for PID map updating.

Security controller 183 processes EMM and ECM data to provide access control functions including entitlement management and key generation. Security controller 183 is included in integrated circuit (IC) 181 and comprises a microprocessor such as the 6805 processor from Motorola. Entitlement management involves processing EMM data to determine how and when entitlement information stored in IC 181 is to be updated, i.e. adding and deleting entitlements. ECM data provides initial values needed for security controller 183 to generate descrambling keys. After being generated by security controller 183, a key is transferred via microcontroller 160 to descrambler 130 where the scrambled data component of the input signal, e.g., the video and audio program data, from the tuned channel is descrambled. In accordance with principles of the invention that are described further below, the descrambling function may also be provided by descrambler 185 included in IC 181.

Descrambled video and audio data is decompressed in video decompressor 140 and audio decompressor 145, respectively. Program data is compressed at the program source using any one of a variety of known data compression algorithms. Decompressors 140 and 145 reverse the effects of the compression algorithm.

The outputs of video and audio decompressors 140 and 145 are coupled to respective video and audio signal processors 150 and 155. Audio signal processor 155 may include functions such as stereo signal generation and digital to analog conversion for converting the digital output signal from decompressor 145 to an analog audio output signal AOUT from processor 155 that can be coupled to a loudspeaker (not shown in FIG. 1). Video signal processor 150 also includes digital to analog conversion capability to convert the digital output of decompressor 140 to an analog video output signal VOUT that is suitable for display on a display device such as a kinescope. Video processor 150 also provides signal switching necessary to include an on-screen display (OSD) signal, produced by OSD processor 170, in signal VOUT. The OSD signal represents, for example, graphics information such as a channel number display that is to be included in the displayed image. Video switches in video processor 150 multiplex the OSD signal into signal VOUT as required to produce the desired display. The operation of OSD processor 170 is controlled by microcontroller 160.

Figure 4:
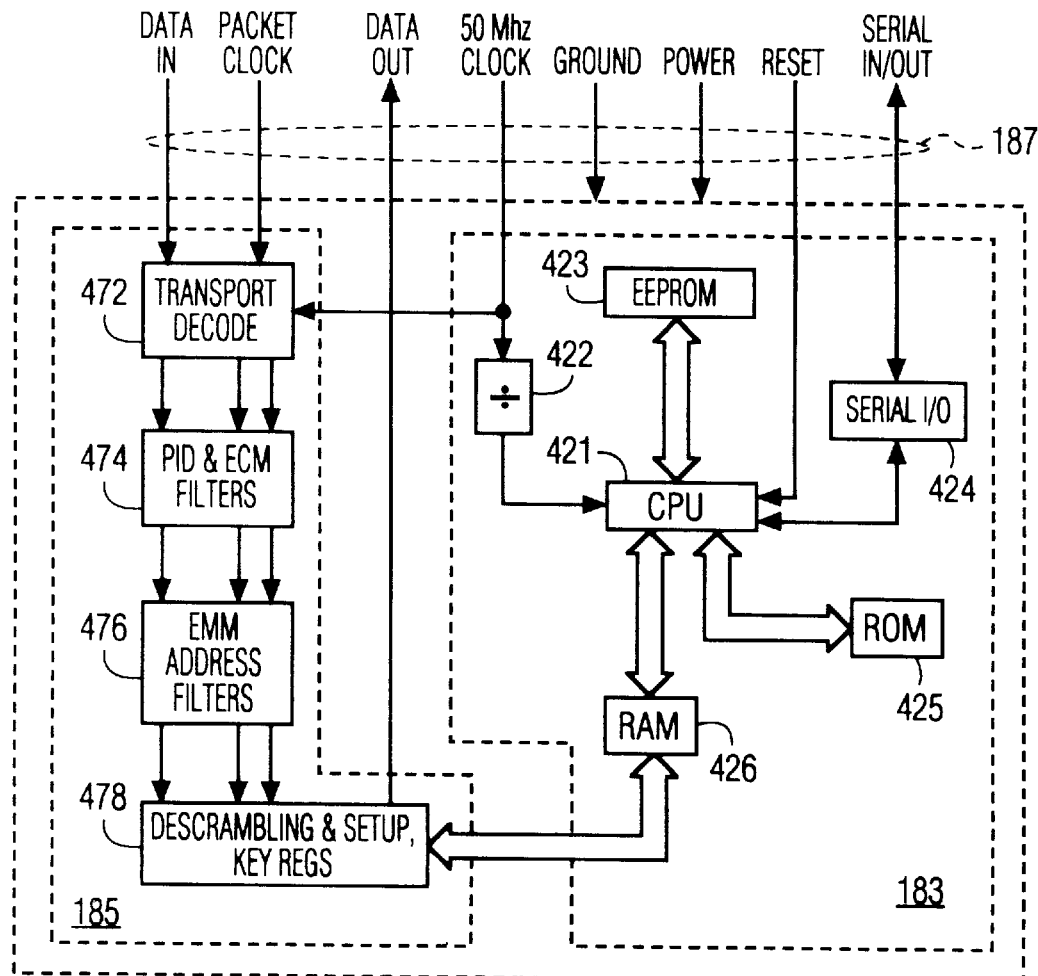
FIG. 4 shows, in block diagram form, an embodiment of signal processing functions included in a smart card suitable for use with the system shown in FIG. 1.

Returning to the access control features of the system shown in FIG. 1, the features and function of smart card 180 may be better understood by referring to the block diagram of smart card IC 181 that is shown in FIG. 4. Reference numerals in FIG. 4 that are the same as in FIG. 1 indicate the same or similar features. In FIG. 4, integrated circuit (IC) 181 includes security controller 183 comprising a central processing unit (CPU) 421, RAM 426, ROM 425, EEPROM 423 and serial I/O unit 424. CPU 421 is a processor such as the 6805 from Motorola. Key generation and entitlement management software is stored in ROM 425 and EEPROM 423.

Data specifying current entitlements is also stored in EEPROM 423 and is modified in response to information in entitlement management messages (EMM) in the received signal. When an EMM packet is detected by transport processor 120 in FIG. 1 (packet PID value of 4), microcontroller 160 in FIG. 1 transfers the packet payload to security controller 183 via serial I/O unit 424. CPU 421 transfers the EMM data in the payload to RAM 426. CPU 421 processes the EMM data and modifies entitlement data stored in EEPROM 423 accordingly.

Packet payloads that include entitlement control messages (ECM), as indicated by the ECM flag in the packet header being active, are transferred from transport unit 120 to security controller 183 via microcontroller 160 and serial I/O unit 424. Any type of packet, e.g., EMM, video, or audio, may include ECM. ECM data is used for generating the descrambling key for a particular type of data. For example, ECM data in an EMM packet is used to generate an EMM descrambling key. When transferred to security controller 183, ECM data is stored in RAM 426 until processed by CPU 421. Key generation software stored in EEPROM 423 and ROM 425 is executed by CPU 421 using the ECM data in RAM 426 to generate a particular key. The ECM data provides information such as initial values required by the key generation algorithms. The resulting key is stored in RAM 426 until transferred by CPU 421 to descrambler 130 via serial I/O unit 324 and microcontroller 160.

EMM and ECM data may be encrypted as indicated by encryption flag ENC in the packet header being active. Encrypted data is transferred from transport unit 120 to descrambler 130 for descrambling before being transferred to security controller 183 for entitlement management or key generation processing.

The features and operation of IC 181 that have been described are typical of known smart card systems. As stated above, however, using a descrambling unit external to a smart card, such as descrambler 130, substantially degrades system security and makes changing descrambling hardware undesirable. The arrangement shown in FIGS. 1 and 4 includes features that significantly improve security in comparison to known smart card systems. In particular, IC 181 of smart card 180 includes descrambler unit 185 and high data rate synchronous interface 184 comprising separate serial data in and serial data out lines. The combination of descrambler 185 and interface 184 makes it possible for all access control processing to occur within smart card 180.

Figures 2A, 2B:
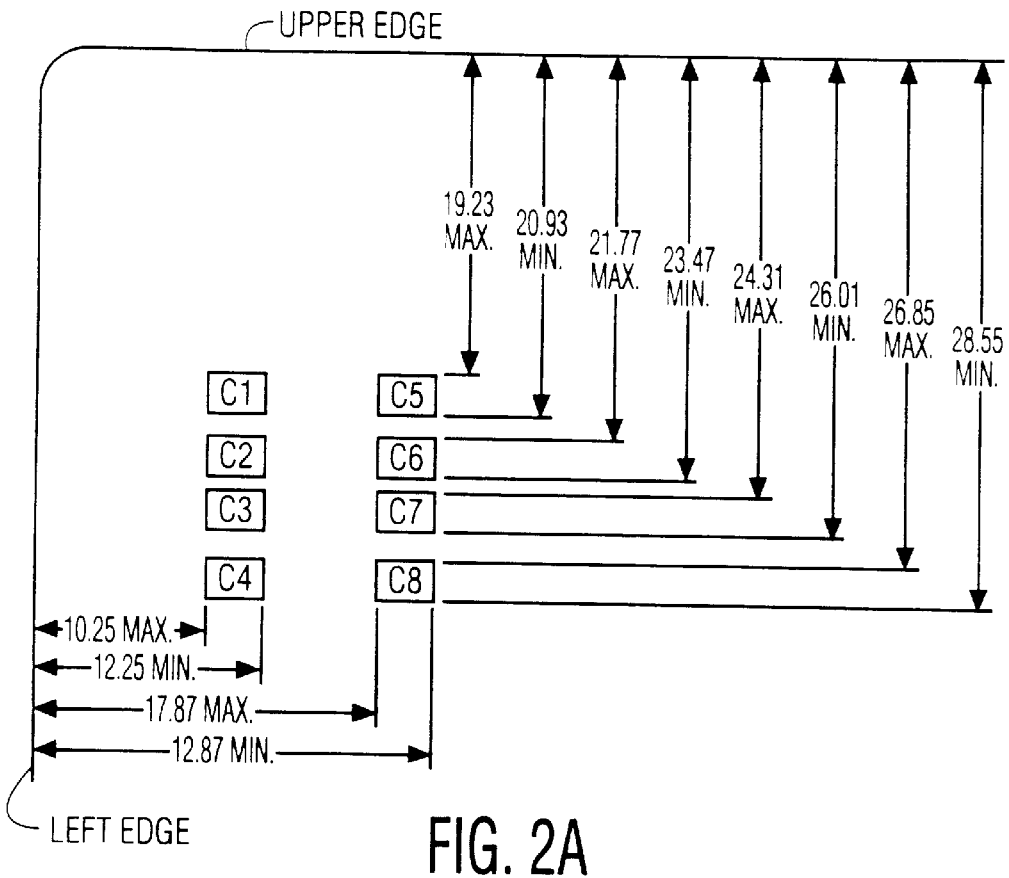
FIG. 2A shows the location of signal contacts on the surface of a smart card in accordance with ISO standard 7816 -2.
FIG. 2B shows the assignment of smart card interface signals to signal contacts shown in FIG. 2A in accordance with ISO standard 7816-2.

In FIG. 1, card reader 190 couples both ISO standard interface signals 165 from microcontroller 160 and high speed interface signals 125 from transport unit 120 to smart card 180 via portions of smart card interface 187 that are labeled 182 and 184, respectively. FIG. 4 shows the signals included in interface 187. ISO standard signals 182 comprise power, ground, reset, and serial I/O in FIG. 4 (correspond to VCC, GND, RST, and I/O in FIG. 2B). High speed interface signals 184 comprise high speed data-in and data-out signals, a packet clock signal, and a high frequency (e.g. 50 MHz) clock signal. ISO standard signal VPP (programming voltage) is replaced by the packet clock signal allowing interface 187, including both high and low speed interfaces, to be implemented using the ISO standard configuration of eight contacts that is shown in FIG. 2A.

Eliminating signal VPP does not preclude the system shown in FIG. 1 from operating with existing ISO standard smart cards that do not include descrambler 185 and high speed data interface 184. Existing smart cards typically include EEPROM circuits that do not require a separate programming voltage. A "charge pump" feature generates the required programming voltage from the card supply voltage when programming is required. Thus, the VPP signal as specified by the ISO standard is an "unused" terminal for most existing ISO standard smart cards. Use of the system with existing smart cards does require modifying the operation of the system such that high speed interface 184 and descrambler 185 are not used. The required modification can be achieved by changing only the control software for controller 160.

Descrambler 185 operates at a high data rate in response to the high frequency clock signal while security controller 183 requires a lower frequency clock signal. Divider 422 in IC 181 divides the 50 MHz clock signal to produce a lower frequency clock signal suitable for security controller 183. Thus, the single high frequency clock signal serves as a timing signal for controlling the operation of both security controller 183 and descrambler 185. Using divider 422 avoids dedicating two of the eight smart card interface signals to separate high and low frequency clock signals.

Descrambler 185 includes transport decode unit 472, PID & ECM filter unit 474 and EMM address filter unit 476 for providing functions similar to the above-described functions of transport unit 120 in FIG. 1. The high speed data-in and data-out signals of interface 187 couple the high speed data stream of the input signal between transport unit 120 and descrambler 185. Including functions of transport unit 120 within smart card 180 enables smart card 180 to process incoming data packets at the high data rate of the input signal. Both the data-in and packet clock signals are coupled to unit 472.

In response to each transition in the packet clock signal, unit 472 processes the 16 bits of header data. The first 12 bits of the header are program identification (PID) data that are directed to PID & ECM filter unit 474. Unit 474 compares the packet's PID data to PID values stored in unit 474 for each type of packet included in the tuned channel. Similarly to the above-described operation of transport unit 120 (see Table 1 above and associated description), PID comparison in unit 474 determines what type of data the payload contains, e.g., program guide, EMM, video, or audio. PID values identifying packet types in the currently tuned signal are stored in registers in unit 474. The registers are loaded as part of the above-described tuning process for the system in FIG. 1. More specifically, microcontroller 160 accesses a stored PID "map" as described above and transfers PID values associated with the currently tuned channel to registers in unit 474 via signals 182 and security controller 183 in smart card 180. Transfer of data between security controller 183 and functions of descrambler 185, such as unit 474, occurs via a data bus internal to IC 181 that is not shown in FIG. 4.

How the payload data is processed by smart card 180 is determined both by the results of PID comparison in unit 474 and by the contents of bits 13 to 16 of the packet header extracted by unit 472. Using the example above relating to channel 101 (see Table 1), PID data identifies: program guide data (PID=1) that microcontroller 160 processes to update the PID map, EMM data (PID=4) that security controller 183 processes to modify entitlements, video data (PID=10) and audio data (PID=11). Bits 13 through 16 of the header control security-related operations (see Table 2 above and the associated description) in smart card 180. If bit 13 (ECM flag) is active, the payload includes ECM data that requires key generation processing by security controller 183. If bit 15 (ENC flag) is active, the payload is encrypted and is descrambled in descrambling unit 478 within descrambler 185. Bit 16 determines whether key A or key B will be used in unit 478 for descrambling.

The encryption status bit ENC determines how payload data will be processed by descrambling unit 478. Payload data that is not encrypted passes unchanged from the high speed data-in terminal of smart card 180 through descrambling unit 478 to the high speed data-out terminal. Encrypted data is descrambled at the data rate by unit 478. Descrambled video and audio data is passed to the high speed data-out terminal of smart card 180. In each descrambled audio or video packet, the ENC bit in the packet header is set to logic 0 indicating that the packet is "clear", i.e. descrambled. To ensure that unauthorized users do not access entitlement or key related data, descrambled EMM or ECM data is not passed out of smart card 180 via the high speed data our terminal. Instead, the original scrambled EMM or ECM data, with the ENC bit set to logic 1, is passed through smart card 180 from the high speed data-in terminal to the high speed data-out terminal. EMM and ECM data that is descrambled in descrambling unit 478 is stored temporarily in RAM 426 in security controller 183 until processed by security controller 183 for entitlement management and key generation. Transport unit 120 in FIG. 1 receives the data (either unchanged or descrambled) from the high speed data-out terminal of smart card 180. The PID value of each packet is checked and the payload is transferred to the appropriate function in FIG. 1 for further processing (e.g., microcontroller 160 or decompressors 140 and 145).

The operation of smart card 180 is controlled by commands from microcontroller 160 in FIG. 1 that are communicated to smart card 180 via the ISO standard serial interface. In effect, microcontroller 160 is the master processor and security controller 183 is the slave processor. For example, microcontroller 160 transfers PID information to smart card 180 and directs the card to descramble the data in the corresponding data streams. Security controller 183 responds by checking entitlements and configuring smart card 180 for the appropriate type of data processing such as entitlement processing, key generation or descrambling. In addition, microcontroller 160 requests status information such as whether descrambling is in progress. Commands are communicated to security controller 183 in smart card 180 via the serial I/O terminal. Any response required by the command is returned to microcontroller 160 via the serial I/O terminal. Thus, the serial I/O signal serves as a control signal between the system and smart card 180 while the high-speed data interface provides high-speed input and output data signals between the card and the system.

Serial communications between microcontroller 160 and smart card 180 occur according to a protocol provided for in ISO standard 7816-3. A smart card notifies the system of the particular protocol that will be used by sending a protocol type number T to the system. More specifically, when a card is inserted into the card reader, the card reader applies power to the card and resets the card by activating the reset signal. The card responds to the reset signal with an "answer to reset" data sequence specified in ISO standard 7816-3 §6. The answer to reset includes an interface byte TDi. The four least significant of byte TDi define the protocol type number T (see ISO standard 7816-3 §6.1.4.3).

The protocol type for the system shown in FIG. 1 is type T=5. A type 5 protocol is classified as "reserved", i.e. currently undefined, in the ISO standard. For the system in FIG. 1, protocol type 5 is identical to protocol type 0 (an asynchronous half-duplex protocol defined in ISO 7816 -3 §8) except for the manner in which the baud rate for serial I/O is determined. Serial I/O at the card interface occurs at a rate determined according to Table 6 in ISO standard 7816-3. The baud rate calculation is based on the rate at which security controller 183 is clocked. For existing smart cards, the clock frequency fs at the card's clock pin. As shown in FIG. 4, smart card 180 includes divider 422 for dividing the rate of the high speed input clock $F_{in}$ by a factor N, i.e. $F_{in}/N$, to establish the clock rate for security controller 183. Thus, for a type 5 protocol, Table 6 of ISO standard 7816-3 is modified by defining $fs=F_{in}/N$.

As in the case of a type 0 protocol, all commands for a type 5 protocol are initiated by microcontroller 160. A command begins with a five byte header including a one-byte instruction class designation (CLA), a one-byte instruction (INS), a two-byte parameter (P1,P2) such as an address, and a one-byte number (P3) defining the number of data bytes that are part of the command and follow the header. For the system in FIG. 1, parameter P1,P2 is not needed and, therefore, these bytes are "don't cares". Thus, commands take the form:

CLA |INS |- |- |P3 |data (P3 bytes).

Commands recognized by smart card 160 include a status command and a PID transfer command. Smart card 160 responds to a status command from microcontroller 160 by providing the processing status of the card, e.g. whether the card has completed key generation or whether the card is descrambling data. Using a PID transfer command, microcontroller 160 transfers PID numbers associated with the tuned channel. Other commands such as commands for transferring EMM and ECM data, key related commands, and "purchase offer" commands are possible and will be explained below.

Figure 5:
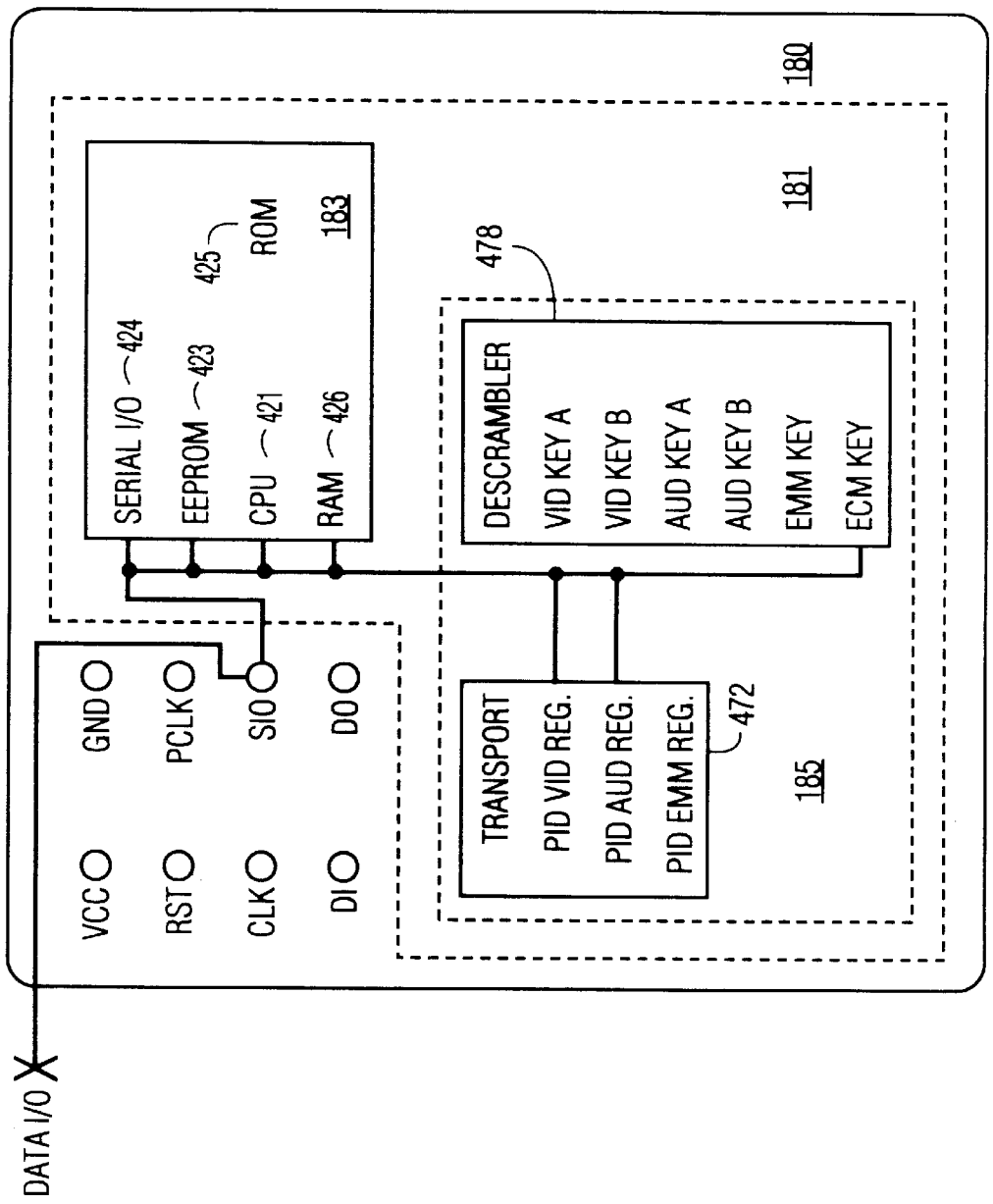
FIGS. 5 through 8 illustrate signal routing through the smart card shown in FIG. 4 during various modes of operation of the system shown in FIG. 1.

The operation of smart card 180, and in particular descrambler 185, will now be described in more detail in reference to FIGS. 5 through 8. When a new channel is tuned, microcontroller 160 transfers PID values for the new channel from the PID map to smart card 180 as shown in FIG. 5. The PID data transfer occurs using a PID transfer command including N PID values, where N is specified in byte P3 of the command header. The command and PID values are communicated to the card via the serial data terminal of smart card 180 and serial input/output unit 424. CPU 421 receives the PID data and directs the data to the appropriate PID register in registers 474 in descrambler 185.

Figure 6:
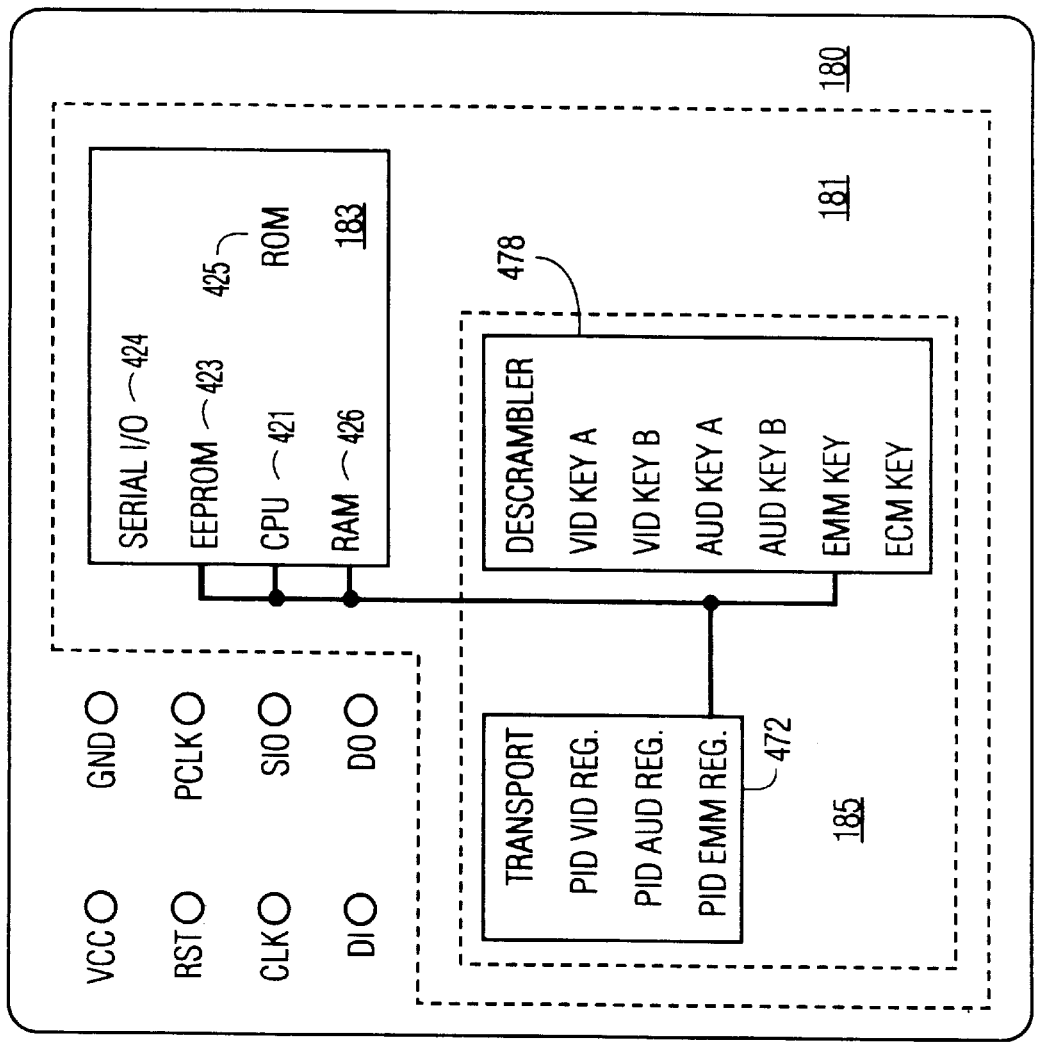

Before a signal can be descrambled, a user must be entitled to access and the correct key must be loaded into descrambler 185. After transfer of the PID data to smart card 180, security controller 183 compares the PID values to entitlement data stored in EEPROM 423 to see if the user is entitled to access the tuned channel. Assuming the user is entitled, the next step is key generation. Key generation involves processing ECM data. Thus, ECM must be received and processed to produce the key before audio and video data can be descrambled. ECM data is encrypted to reduce the likelihood of unauthorized key generation. A card is issued with a key for descrambling ECM stored in the card in EEPROM 423. As illustrated in FIG. 6, the ECM key is transferred by CPU 421 from EEPROM 423 to ECM key registers in descrambling unit 478.

If the user is not entitled to access the tuned channel, entitlements must be received before key generation and descrambling can occur. Entitlements can be received via EMM. An "address" identifying a particular smart card is stored in EMM address unit 476 of the card when the card is issued. By including address information in EMM, a service provider can direct EMM to a particular card. The smart card compares the address information in EMM with the card address stored in unit 476 to detect EMM information directed to the card. If a user is not entitled, security controller 183 configures the card for EMM processing as shown in FIG. 6 in case EMM data is received.

As in the case of the ECM key, a card is issued with an EMM key stored in the card in EEPROM 423. In FIG. 6, the EMM key is transferred from EEPROM 423 to EMM key registers in descrambling unit 478 by CPU 421. Scrambled EMM data from transport unit 120 in FIG. 1 is input to the card via the high speed data-in port. After checking the EMM address in unit 476, EMM data intended for the card is decrypted in descrambling unit 478. Decrypted EMM data is temporarily stored in RAM 426 and processed by CPU 421 to update entitlement data stored in EEPROM 423.

Figure 7:
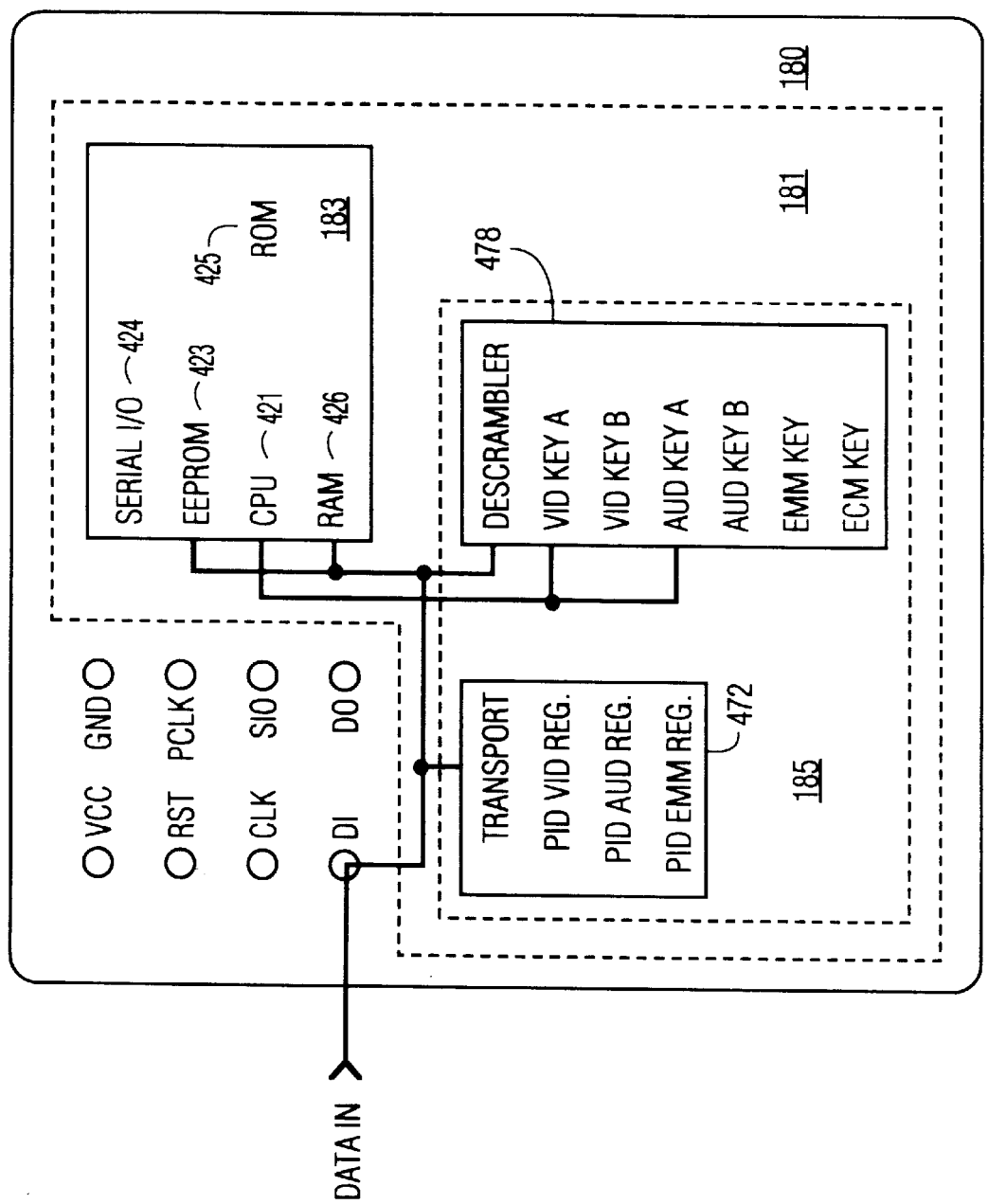

After the PID values are loaded, entitlements exist, and the ECM key is in place in descrambler 185, the card is ready to descramble ECM data and generate the audio and video keys. In FIG. 7, ECM data in the signal is received by smart card 180 via the high speed data-in terminal and detected by transport decode unit 472. The ECM data is directed to descrambler 478 where the previously loaded ECM key is used to decrypt the ECM data. The decrypted ECM data is transferred from descrambler 478 to RAM 424. When decrypted ECM data is available, CPU 421 executes key generation algorithms stored in EEPROM 423 and ROM 425 using the decrypted ECM data in RAM 424 to generate the video and. audio keys. The generated keys are transferred to the appropriate video and audio key registers in descrambler 478.

As shown in FIG. 7, descrambler 478 includes two key registers for video, video keys A and B, and two key registers for audio, audio keys A and B. Whether key A or B will be used to descramble a particular packet is determined by the key flag bit in the packet header (see Table 2 above). The "multi-key" feature is used to permit a new key to be generated while an existing key is being used to descramble data. Processing ECM data in security controller 183 to generate a new key and transferring the new key to a key register in descrambler 478 requires a significant number of instruction cycles in CPU 421. If descrambling was halted during the generation and transfer of a new key, the processing delay would require someone viewing a program to watch a scrambled image until the new key was in place in descrambler 478. Having key registers A and B permits data to be decrypted using a key in one key register, e.g., key register A, while a new key is being generated and loaded into the second key register, e.g., key register B. After initiating key generation by transmitting ECM data, a service provider waits for a time period sufficient to ensure that new key B is generated and in descrambler 478 before encrypting packets using key B. The key flag notifies descrambler 185 when to begin using the new key.

Figure 8:
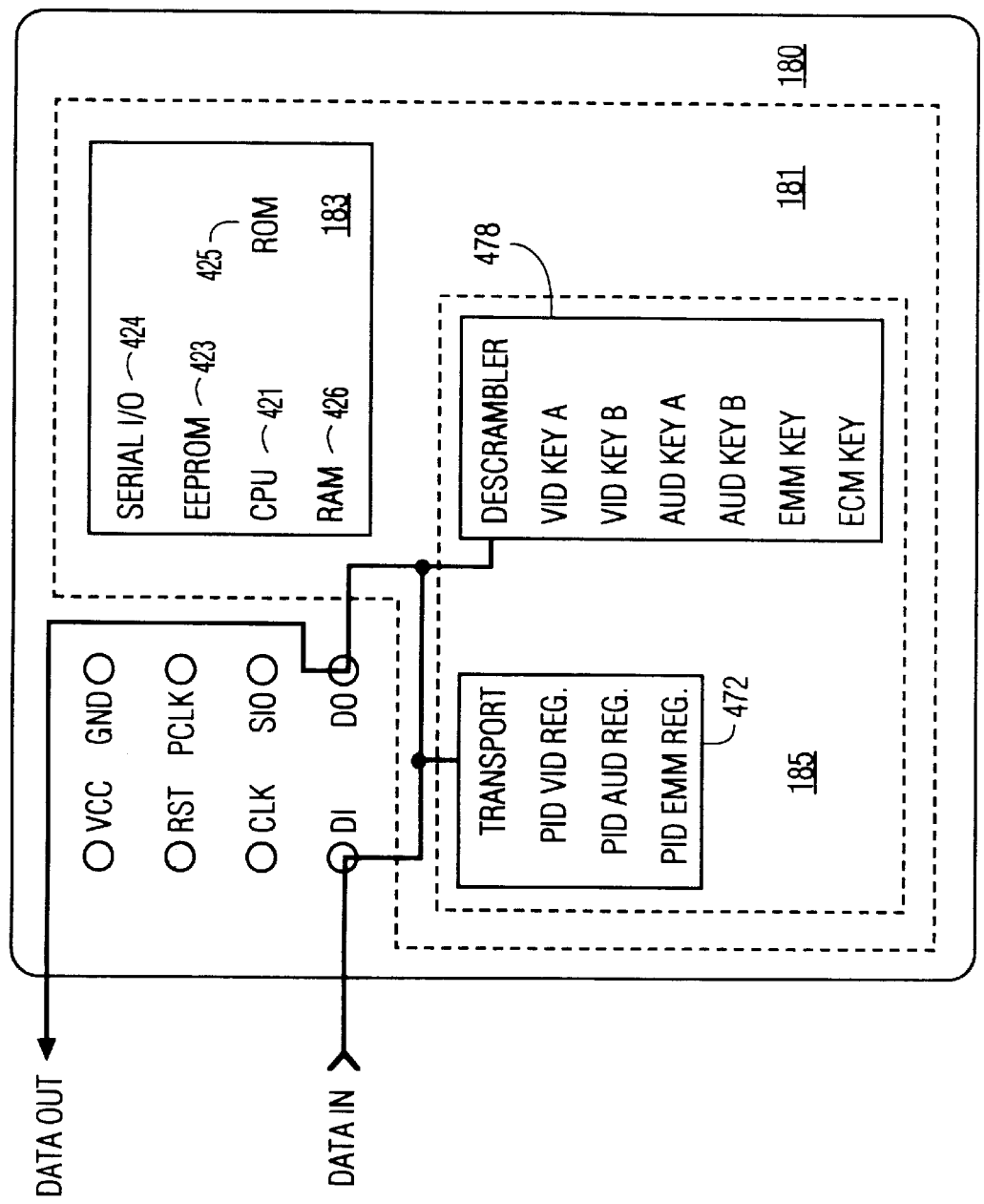

After the operations shown in FIGS. 5, 6, and 7, descrambler 478 has been initialized with all key information needed to process encrypted data in the tuned channel, including EMM, ECM, video and audio data. FIG. 8 shows the signal flow for data processing. Encrypted data enters smart card 180 via the high speed serial data input terminal. The data is decrypted in descrambler 478 using the previously loaded keys. For example, if transport unit 472 determines from the header of an incoming packet that the payload data is video data associated with video key A, the packet payload is decrypted in descrambler 478 using video key A. The decrypted data is output directly from smart card 180 via the high speed serial data output terminal. Note that data processing in FIG. 8 does not require interaction between descrambling unit 185 and security control unit 183 allowing descrambler 478 to process data at the high data rate of the input signal.

Key generation in security controller 183 combined with the descrambling features of descrambling unit 478 provides complete capability in smart card 180 for processing signals encrypted using a variety of algorithms including the data encryption standard (DES) algorithm and Rivest-Shamir-Adlemann (RSA) algorithms. By providing all access control related processing within smart card 180, security related data such as key data does not have to be transferred out of smart card 180. As a result, security is improved significantly in comparison to systems using a descrambler external to the smart card.

Although the use of descrambler 185 internal to smart card 180 is advantageous, an external descrambler such as descrambler 130 in FIG. 1 may also be used. An external descrambler may be desirable for compatibility of the described smart card with existing pay-TV systems that generate the key in smart card 180 and transfer the key to descrambler 130. Alternatively, using both descrambler 185 and descrambler 130 may be desirable. For example, security can be improved by encrypting a signal twice using two different keys. A twice-encrypted signal could be decrypted using the system shown in FIG. 1 by: decrypting the signal once in descrambler 185 using the first key, transferring the partially decoded data to descrambler 130, and decrypting the signal a second time in descrambler 130 using the second key. The second key would be generated in smart card 180 and transferred to descrambler 130.

For applications involving descrambler 130 (i.e. applications in which key data is transferred out of smart card 180), commands are provided for transferring the key data via the serial I/O interface between controller 160 and smart card 180. For example, microcontroller 160 sends ECM data to the card in one command and requests the status of key generation with a status command. When the status data indicates that key generation is complete, another command requests the key data and the card responds by sending the key data to controller 160. Subsequently, the key is transferred to descrambler 130.

Modifying the system in FIG. 1 in accordance with principles of the invention permits processing data via an arrangement of a plurality of smart cards in which the high speed data paths of the cards are connected in series. More specifically, the high speed data-out terminal of one card is connected to the high speed data-in terminal of the next card. As will be described in regard to FIGS. 9 through 12, a system processing video data via series connected smart cards can use multiple access-controlled signals, such as pay-TV signals, to provide features such as picture-in-picture (pix-in-pix or PIP) and picture-outside-picture (POP) in a video system such as a television receiver. For example, a PIP feature generates a signal representing both a main video picture and one or more small pictures that are inset into a portion of the main picture. In a television receiver, the main picture may be produced in response to the signal from one television channel while the inset picture is produced in response to the signal from a second television channel. Using a series connection of two or more smart cards, one smart card processes a first signal, e.g., descrambles a pay-TV signal, to provide the main picture while one or more additional smart cards process one or more other signals, such as other pay-TV signals, to provide the inset picture or pictures.

Figure 9:
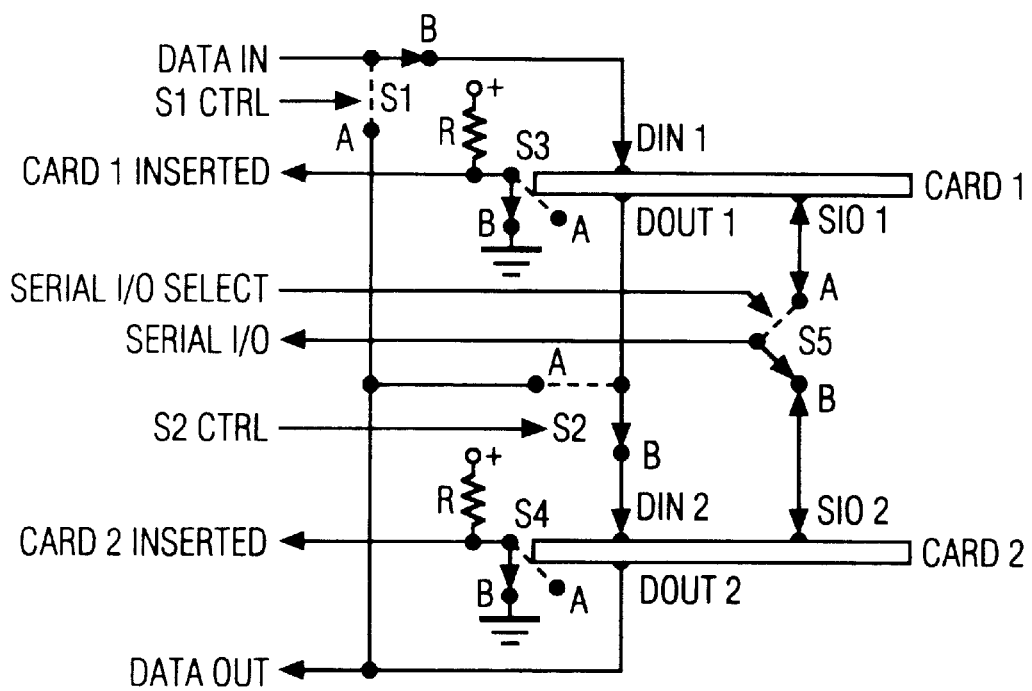
FIG. 9 shows a portion of a signal processing system including a series-connection of a plurality of smart cards.

FIG. 9 shows a switching arrangement for use in a smart card reader to provide the described series-connected high speed data path. In FIG. 9, switches 1 and 2 are responsive to the insertion of cards 1 and 2, respectively, into the card reader. Switches 1 and 2 determine the routing of the high speed DATAIN and DATAOUT signals to the descrambler in the respective smart card. Each switch is shown as a single-pole-single-throw (SPST) switch that will be in one of two possible states, A or B, depending on whether or not the corresponding card is inserted: state A if the respective card is not inserted, and state B if the card is inserted. In state A, a switch causes input data, i.e. signal DATAIN, to bypass the corresponding card. In state B, input data is connected to the inserted card.

In FIG. 9, both cards 1 and 2 are inserted causing both switches 1 and 2 to be in position B. As a result, high speed data is routed from DATAIN through cards 1 and 2 in series. If only a single card is being used, card 2 is not inserted, switch S2 is in position A, and high speed data bypasses card 2. The switching configurations for the arrangement in FIG. 9 are listed in Table 3.

TABLE 3

| Card Status | | Switch Position | | |
| --- | --- | --- | --- | --- |
| Card 1 | Card 2 | S1 | S2 | Connection |
| inserted | inserted | B | B | DATAIN to DIN1; DOUT1 to DIN2; DOUT2 to DATAOUT |
| inserted | removed | B | A | DATAIN to DIN1; DOUT1 to DATAOUT (bypass card 2) |
| removed | removed | A | A | DATAIN to DATAOUT (bypass cards 1 & 2) |

The operation of the high speed data signal switching arrangement shown in FIG. 9 involves signals S1 CTRL, S2 CTRL, CARDI INSERTED and CARD2 INSERTED. Switches S1 and S2 are electronic switches controlled by signals S1 CTRL and S2 CTRL, respectively. The switch control signals are generated by a control processor either in the card reader or in the system (e.g., microcontroller 160 in FIG. 1) in response to signals CARDI INSERTED and CARD2 INSERTED. Signals CARDI INSERTED and CARD2 INSERTED are generated by switches S3 and S4, respectively, in response to the insertion of the corresponding card and are coupled to respective interrupt inputs of microcontroller 160.

Before card 1 is inserted, signal S1 CTRL is at logic 0 causing electronic switch S1 to be at position A and signal DATAIN bypasses card 1. Inserting card 1 into the card reader causes switch S3 to change from position A (card removed) to position B (card inserted). As a result, signal CARD1 INSERTED changes from logic 1 (+supply voltage) to logic 0 (ground). The interrupt handling routine of microcontroller 160 detects the change in signal CARD1 INSERTED and changes the level of signal S1 CTRL. Switch S1 responds by changing to position B coupling signal DATAIN to card 1. Switches S2 and S4 operate in a similar manner in response to card 2 being inserted.

The described card reader operation routes the high speed data signal through the descrambler of each card inserted in the card reader. For descrambling a signal that was encrypted more than once, each descrambler in the series connection descrambles the signal using a particular key and algorithm. For a series connection of cards in which each card corresponds to a particular service, each card descrambles data for the service associated with the card and passes other data unchanged. Selective descrambling in each card is accomplished by PID processing in each card. The PID registers in each card are loaded with the PID values for the service corresponding to the card. Each card checks the PID data in the header of each packet in the signal. If the PID data does not correspond to the PID data stored in the card, the data passes through the card unchanged. A packet payload is descrambled only in a card in which the card PID data matches the packet PID data.

Control of a multi-card series-connected "stack" such as that shown in FIG. 9 is accomplished via the ISO standard serial I/O signal. In addition to the high-speed data 110 signals shown in FIG. 9, smart card interface signals "clock", "packet clock", "power" and "ground" (see FIG. 4 and associated description) are coupled to each card inserted in card reader 190. Interface signals "serial I/O" and "reset" are coupled to only one smart card at any particular time. Controller 160 detects that a card is inserted via signals CARDI INSERTED or CARD2 INSERTED and controls switch S5 to couple the serial I/O and reset signals to an inserted card, as needed, to transfer data to the card If more than one card is inserted, controller 160 communicates with a particular card by controlling switch S5 to couple the serial I/O and reset signals to only that particular card. The flow of high speed data through each card in the serially-connected stack of cards is not affected by the operation of switch S5.

One aspect of the control of a card stack involves a delay between high speed data and the packet clock signal that depends on the location in the stack of a particular card. The high speed data path of a smart card exhibits a bit delay from data-in to data-out equal to the number of high speed clock cycles required for the data processing operation that is occurring in the card. A card that is merely passing data from data-in to data-out will create a different bit delay than a card that is descrambling data. The series connection of cards in the stack causes high speed data arriving at a particular card in the stack to exhibit a bit delay with respect to packet clock that depends on the number of cards in the stack prior to a particular card and the type of processing occurring in each card prior to a particular card.

If the bit delay is not corrected, cards in the stack other than the first card will process the packetized data stream improperly. For example, packet header data is extracted based on the occurrence of transitions in the packet clock signal. A bit delay with respect to packet clock will result in improper extraction of the header data and, subsequently, incorrect processing of the payload data.

Correcting for bit delays is accomplished by communicating bit delay information between controller 160 and security controller 183 of each card in the stack. Each card returns its particular bit delay value to controller 160 in response to a command from controller 160. A card determines its current bit delay by, for example, referring to a look-up table in the card memory that specifies a bit delay value for each data processing mode, i.e. descrambling, pass-through, etc. Controller 160 acquires the bit delay data for each card in the stack and sends to each card information including: the number of cards in the stack, the position of the card in the stack (e.g., card 2) and the bit delay for all cards in the stack prior to the particular card. The card corrects for bit delay by, for example, using the stack bit delay information from controller 160 to control a variable delay circuit included in the packet clock signal path within transport unit 478.

Figure 10:
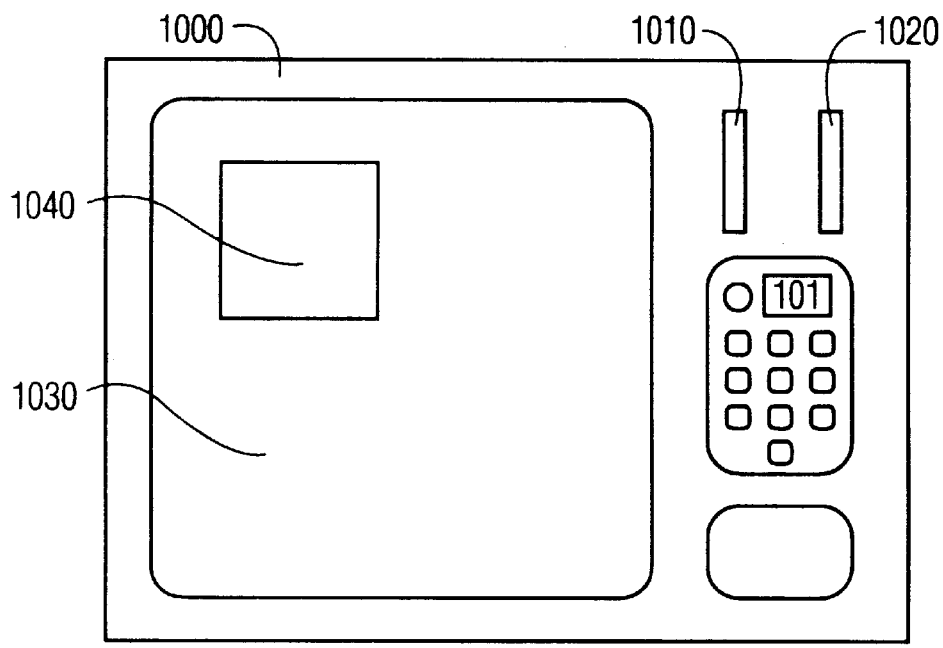
FIG. 10 shows a television receiver including features shown in FIG. 9.

The arrangement shown in FIG. 9 for reading a plurality of smart cards can be included in a television receiver. For example, FIG. 10 shows a television receiver 1000 including the capability for simultaneously reading two smart cards. Two cards are inserted in slots 1010 and 1020. Card reading circuitry similar to circuitry shown in FIG. 9 is included in receiver 1000 to produce the above-described series connection of two smart cards. As will be described further in regard to FIGS. 11 and 12, first and second smart cards inserted in slots 1010 and 1020 in FIG. 10 process respective pay-TV signals to provide a PIP feature that produces main picture 1030 and inset picture 1040.

Figure 11:
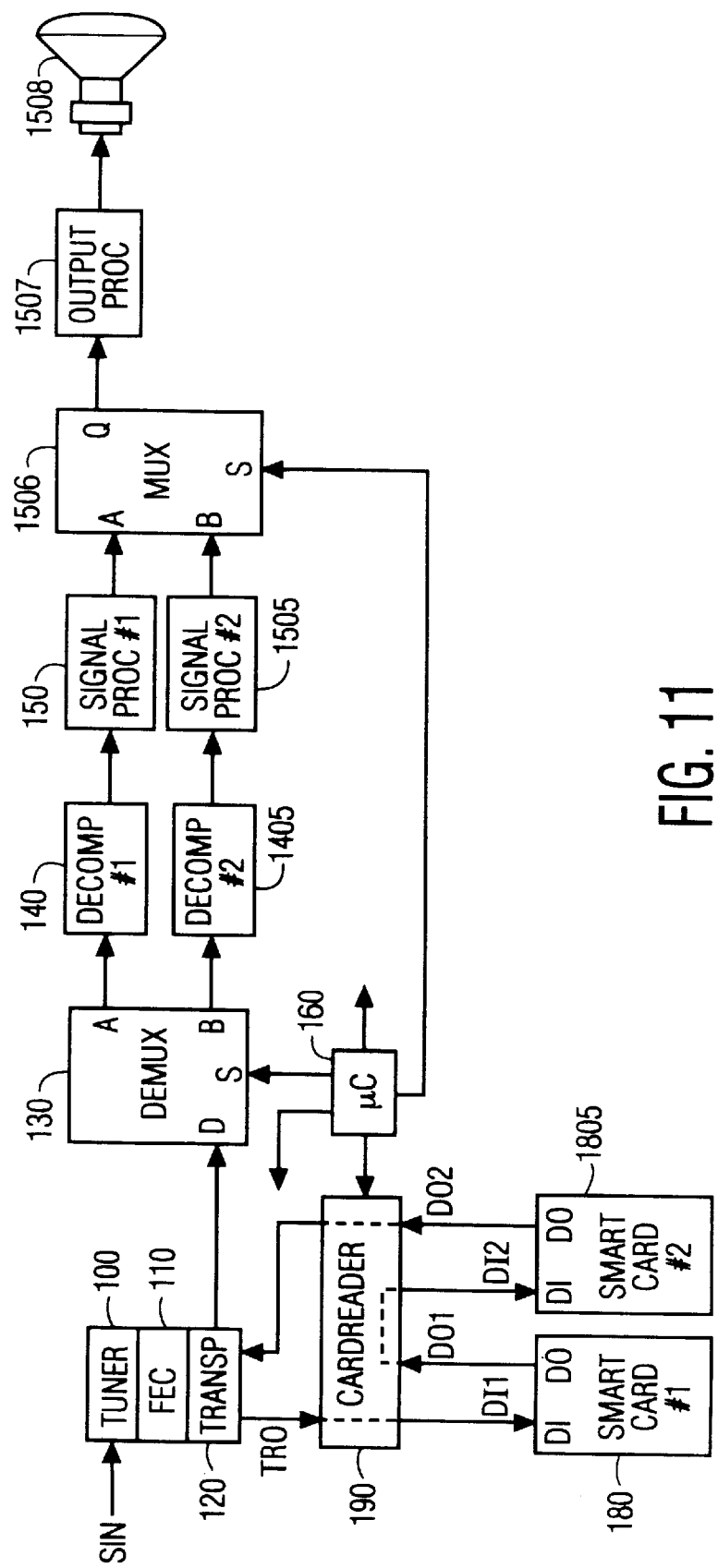
FIGS. 11 and 12 show, in block diagram form, portions of signal processing systems constructed in accordance with principles of the invention.
Figure 12:
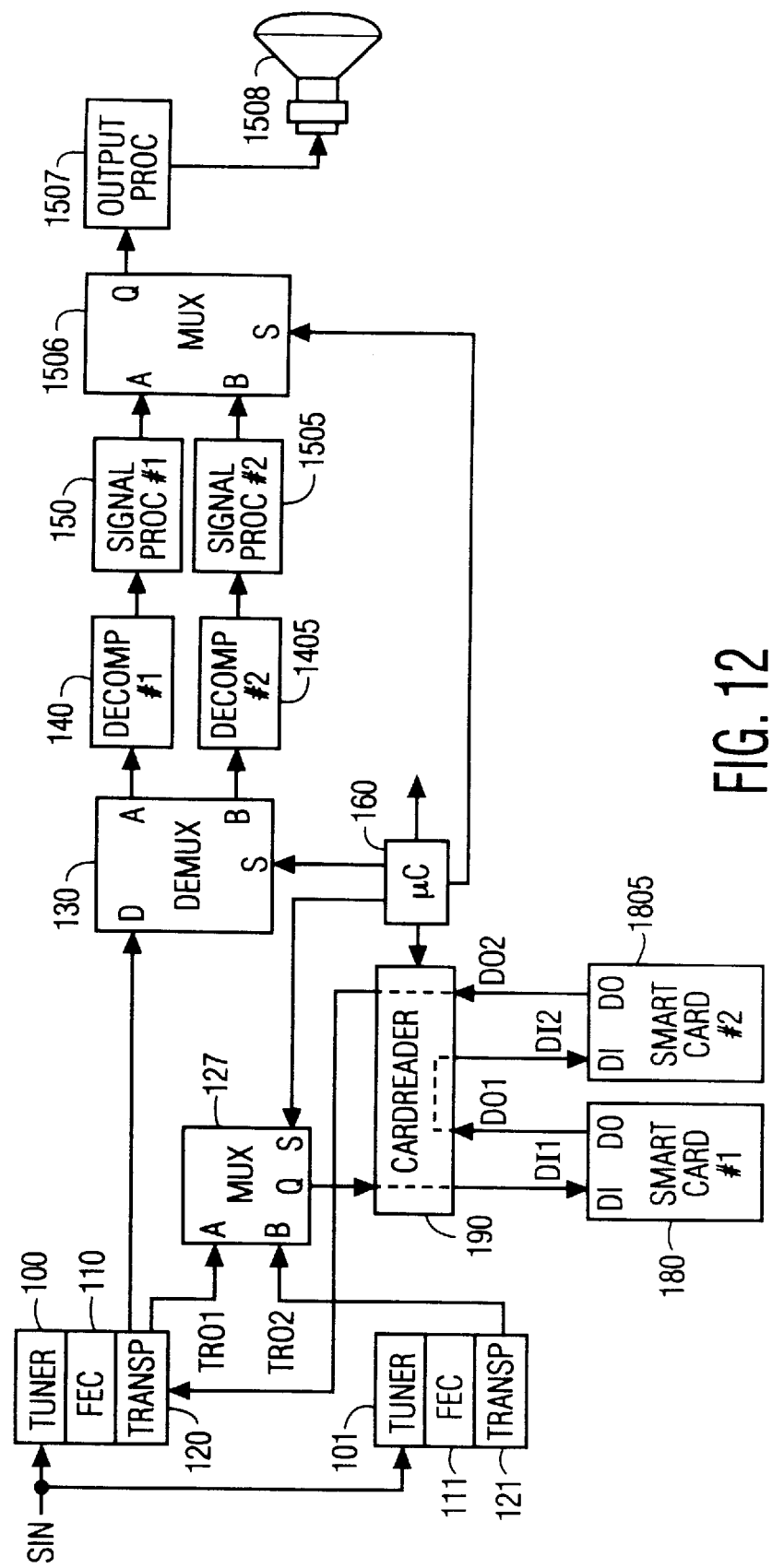

FIG. 11 shows a portion of a system for processing a video signal through smart cards 180 and 1805 connected in series in the manner described in regard to FIG. 9. Each smart card includes features described in regard to FIGS. 1 and 4–8. Reference numerals used in FIG. 11 that also appear in FIG. 1 identify the same or similar features. Features common to FIGS. 1 and 11 are explained above in detail in the description of FIG. 1. FIGS. 11 and 12 will be described in the context of processing television signals, but other video signals may be processed in a similar manner.

As described above in regard to FIG. 1, tuner 100, forward error corrector (FEC) 110 and transport unit (TRANSP) 120 in FIG. 11 process input signal SIN under control of controller (μC) 160 to produce an output signal TRO from transport unit 120 that includes data representing desired television programs. To provide a multi-image display feature such as PIP or POP in which the main and small pictures correspond to different television programs, signal TRO from transport unit 120 includes a signal component corresponding to each program. Using the above-described packetized signal format as an example, a first component of signal TRO includes a first group of data packets exhibiting a first PID value corresponding to the first television program. A second component of signal TRO includes a second group of packets exhibiting a second PID value corresponding to the second television program. Each of the two components of signal TRO may be scrambled.

Signal TRO is coupled to high speed data input DI1 of first smart 180 via card reader 190. Smart card 180 processes a first one of the two components of signal TRO, e.g., the component representing the program that will appear in the main picture. Processing in smart card 180 includes descrambling of the data in the component if the data is scrambled. High speed data output signal DO1 from the first smart card includes the processed first component, e.g., descrambled, and the unprocessed second component. As explained above in regard to FIG. 9, card reader 190 connects the high speed data path of smart card 180 in series with the high speed data path of second smart card 180S by coupling data output DO1 of first smart card 180 to data input DI2 of second smart card 180S. Smart card 180S processes the second component of the signal, including descrambling as required, to produce high speed data output signal DO2. Signal DO2 includes the processed first component and the processed second component. If both components of signal TRO were scrambled, signal DO2 includes first and second descrambled components corresponding to the original scrambled components.

Signal DO2 is returned to transport unit 120 via card reader 190 for routing to other functions in the system. As an example, to produce a PIP display, signal DO2 is routed to demultiplexer (DEMUX) 130 that separates the first and second processed signal components under control of controller 160. The first and second processed signal components are decompressed in decompressor units 140 and 1405, respectively. The decompressed data undergoes further processing in signal processors 150 and 1505. In the case of creating a small picture such as for a PIP or POP display, the one of processors 150 and 1505 that processes the small picture signal may include video memory for storing and accessing data corresponding to the small picture. The signals output by processors 150 and 1505 are combined by multiplexer (MUX), or switch, 1506, to provide a signal that will produce the desired image including a small picture in the desired portion of the image. Controller 160 controls the timing of MUX 1506 to insert the signal component corresponding to the small picture at the appropriate time. Output processor 1507 couples the image signal to a display device such as kinescope 1508. Functions such as contrast control brightness control and kinescope driver amplification are provided by output processor 1507.

The system shown in FIG. 11 provides the desired multi-image feature when signal DI1 at the data input of first smart card 180 includes first and second signal components representing first and second television programs as described. Such is the case if the signal tuned by tuner 100 includes both components or, for example, if signal DI1 is provided by a source other than the tuner, FEC and transport units shown in FIG. 11 that provides a signal including both components. An example of an alternative signal source is a cable television signal that includes signal components corresponding to various channels.

In the case of a signal received directly from a satellite such as the DSS® signal described above, signal SIN in FIG. 11 includes signals at various frequencies produced by the various transponders of the satellite. Tuner 100 tunes only one of the transponder signals at a time. Although each tuned transponder signal includes signal components corresponding to a plurality of television programs, the signal components needed to produce a multi-image display, e.g., the main and small picture channels selected by a user, may be received via different transponders. If so, the signal tuned by tuner 100 (and signals TRO and DI1) includes only one of the signal components required to produce the desired multi-image display. This situation is addressed by the system shown in FIG. 12.

In FIG. 12, tuner 101, FEC 111, transport unit 121, and multiplexer (MUX) 127 are added to the system shown in FIG. 11. Tuner 100, FEC 110 and transport unit 120 tune the signal from one transponder and produce signal TRO1 that includes one of the signal components needed to produce the multi-image display. Tuner 101, FEC 111 and transport unit 121 tune the signal from a second transponder and produce signal TRO2 that includes a second one of the required signal components. MUX 127 combines signals TRO1 and TRO2 under control of controller 160 to produce a signal at the output of MUX 127 that includes both of the required signal components. The MUX output signal is coupled to the first smart card via card reader 190 and processed as described above in regard to FIG. 11 to produce the desired multi-image display.

Various modifications of the described embodiments are possible. It will be readily apparent to one skilled in the art that the invention is applicable to video systems and video signal protocols other than that depicted in FIGS. 3, 11 and 12. Examples of other systems are the above-mentioned DSS® satellite system and high-definition television (HDTV). Also, the arrangements shown in FIGS. 9 through 12 may be expanded to accommodate more than two smart cards. For example, in FIG. 9, a switch and card detection capability (i.e. generating a CARD INSERTED signal) is added for each additional card. Adding smart cards would permit descrambling more than two signal components and producing displays including an image portion corresponding to each descrambled signal component. In addition, the switching arrangement in FIG. 9 could be modified to control switches S1 and S2 directly in response to cards being inserted rather than relying on control by microcontroller 160. For example, switch S3 could be mechanically, or electrically, coupled directly to switch S1 such that inserting card 1 causes switch S1 to route data through card 1. Also, although the described embodiments relate to digital I/O signals coupled to smart card 180, smart card 180 may also process analog signals. For example, smart card 180 may include an analog to digital converter (ADC) at the high-speed data input and a digital-to-analog converter (DAC) at the high-speed data output. The ADC and DAC may be located on IC 181 in FIG. 1. Alternatively, IC 181 may be replaced with a "hybrid" device, i.e. rather than just IC 181, smart card 180 would include ADC and DAC circuits and IC 181 all mounted and interconnected on a single substrate. For an analog signal processing smart card, card reader 190 would couple analog signals to the smart card. These and other modifications are intended to be within the scope of the following claims.

I claim:

1. A video signal processing system comprising:

a source of a video signal including first and second signal components representative of respective first and second video programs; said first and second signal components including control information for identifying said different respective video programs therein and for enabling access to said programs;

coupling means for coupling said video signal to an input of a first smart card for coupling an output signal produced by said first smart card to an input of a second smart card and for receiving an output signal produced by said second smart card; said output signal from said first smart card being produced in response to said video signal and said output signal from said second smart card being produced in response to said output signal from said first smart card; and means responsive to said output signal from said second smart card for providing a signal suitable for coupling to an image display device for producing an image including a first image portion representative of said first video program and including a second image portion representative of said second video program.

2. The video signal processing system of claim 1 including said first and second smart cards and wherein:

said first and second signal components of said video signal comprise respective first and second scrambled signal components;

said output signal from said first smart card includes a first descrambled signal component representative of said first video program and includes said second scrambled signal component;

said output signal from said second smart card includes said first descrambled signal component and includes a second descrambled signal component representative of said second video program.

3. A video signal processing system according to claim 2 wherein each of said first and second smart cards comprise:

a signal processor included in an IC mounted in said smart card for processing a plurality of signals; and a plurality of terminals positioned on a surface of said smart card for coupling said plurality of signals to said IC;

said plurality of signals comprising an input data signal an output data signal separate from said input data signal and a control signal; each of said plurality of signals being coupled to a respective one of said plurality of terminals; and said signal processor included in said IC processes said input data signal responsive to control information included in said control signal to produce said output data signal.

4. The video signal processing system of claim 3 wherein:

said plurality of signals further comprises a timing signal;

said signal processor included in said IC is responsive to said timing signal for processing said input data signal at a first data rate to produce said output data signal at said first data rate.

5. The video signal processing system of claim 4 wherein said first data rate exceeds 10 mega-Hertz.

6. The video signal processing system of claim 5 wherein said control signal comprises a bidirectional signal and said input data signal and said output data signals are unidirectional signals.

7. The video signal processing system of claim 6 wherein said plurality of terminals is arranged on said space of said smart card in accordance with ISO standard 7816-2.

8. The video signal processing system of claim 7 wherein said smart card exhibits a mechanical characteristic in accordance with ISO standard 7816-1.

9. The video signal processing system of claim 8 wherein said signal processor included in said IC is responsive to said timing signal for processing said control signal at a second data rate for controlling processing of said input data signal.

10. The video signal processing of claim 9 wherein said first data rate is greater than said second data rate.

11. The video signal processing system of claim 10 wherein said IC includes a frequency divider coupled to receive said timing signal for producing a first signal at a first frequency related to said first data rate for controlling processing of said input data signal by said signal processor, and for producing a second signal at a second frequency related to said second data rate for controlling processing of said control signal by said signal processor.

12. The video signal processing system of claim 1 wherein said source of said video signal comprises a tuner for tuning said video signal from a plurality of video signals.

13. The video signal processing system of claim 1 wherein said source of said video signal comprises:

means for producing a first signal representative of said first video program and including said first signal component;

means for producing a second signal representative of said second video program and including said second signal component; and means for combining said first and second signals representative of said first and second video programs, respectively, to produce said video signal including said first and second signal components.

14. A method for producing a signal suitable for coupling an image to an image display device comprising the steps of:

processing a video signal in a first smart card to produce a first processed signal; said video signal comprising a first and a second signal component including control information for identifying said different respective programs therein and for enabling access to said programs;

processing said first processed signal in a second smart card to produce a second processed signal; and processing said second processed signal to provide an image signal suitable for coupling to an image display device for producing an image including a first image portion representative of said first video program and including a second image portion representative of said second video program.

15. The method of claim 14 wherein the step of processing said video signal in said first smart card comprises the step of descrambling a first scrambled signal component included in said first signal component of said video signal.

16. The method of claim 15 wherein the step of processing said first processed signal in said second smart card comprises the step of descrambling a second scrambled signal component included in said second signal component of said video signal.

* * * * *